(12) United States Patent
Grocutt et al.

(10) Patent No.: US 9,202,071 B2
(45) Date of Patent: Dec. 1, 2015

(54) EXCEPTION HANDLING IN A DATA PROCESSING APPARATUS HAVING A SECURE DOMAIN AND A LESS SECURE DOMAIN

(71) Applicant: ARM Limited, Cambridge (GB)

(72) Inventors: Thomas Christopher Grocutt, Impington (GB); Richard Roy Grisenthwaite, Guilden Morden (GB)

(73) Assignee: ARM Limited, Cambridge (GB)

( * ) Notice: Subject to any disclaimer, the term of this patent is extended or adjusted under 35 U.S.C. 154(b) by 127 days.

(21) Appl. No.: 13/741,709

(22) Filed: Jan. 15, 2013

(65) Prior Publication Data

US 2013/0212700 A1     Aug. 15, 2013

Related U.S. Application Data

(63) Continuation-in-part of application No. 13/368,419, filed on Feb. 8, 2012.

(30) Foreign Application Priority Data

Oct. 1, 2012 (GB) .................................. 1217531.1
Nov. 19, 2012 (GB) .................................. 1220771.8

(51) Int. Cl.
*G06F 21/00*     (2013.01)
*G06F 21/60*     (2013.01)
(Continued)

(52) U.S. Cl.
CPC .............. *G06F 21/606* (2013.01); *G06F 21/52* (2013.01); *G06F 9/3009* (2013.01); *G06F 9/30101* (2013.01); *G06F 21/74* (2013.01); *G06F 2209/481* (2013.01); *G06F 2221/2105* (2013.01)

(58) Field of Classification Search
CPC ... G06F 21/74; G06F 9/30101; G06F 9/3009; G06F 12/1491; G06F 2209/481
USPC .......................................................... 726/27
See application file for complete search history.

(56) References Cited

U.S. PATENT DOCUMENTS 4,177,514 A    12/1979   Rupp
4,488,227 A    12/1984   Miu et al.
(Continued)

FOREIGN PATENT DOCUMENTS

| EP | 1 331 539 | 7/2003 |
| GB | 2 396 034 | 6/2004 |
| JP | 09091154 A | 4/1997 |

OTHER PUBLICATIONS

Micromint USA, Eagle interrupts Example, Jun. 20, 2010, micromint.com, pp. 1 and 2, downloaded from http://wiki.micromint.com/index.php/Eagle_interrupts_Example on Nov. 12, 2014.*

(Continued)

*Primary Examiner* — Carl Colin
*Assistant Examiner* — Gary Lavelle
(74) *Attorney, Agent, or Firm* — Nixon & Vanderhye P.C.

(57) ABSTRACT

A data processing apparatus and method are provided for handling exceptions, including processing circuitry configured to perform data processing operations in response to program code, said circuitry including exception control circuitry. A plurality of registers are provided including a first and second subsets of registers, and a data store. The data store includes a secure region and a less secure region, wherein the secure region is for storing data accessible by the processing circuitry when operating in a secure domain and not accessible by the processing circuitry when operating in a less secure domain. The exception control circuitry performs state saving of data from the first subset of registers before triggering the processing circuitry to perform an exception handling routine corresponding to the exception. Where background processing was performed by the processing circuitry in the secure domain, the exception control circuitry performs additional state saving of the data.

19 Claims, 14 Drawing Sheets

(51) Int. Cl.
*G06F 21/52* (2013.01)
*G06F 21/74* (2013.01)
*G06F 9/30* (2006.01)

(56) References Cited

U.S. PATENT DOCUMENTS

| | | | |
|---|---|---|---|
| 4,519,032 A | | 5/1985 | Mendell |
| 5,590,332 A | * | 12/1996 | Baker ........................ 717/151 |
| 5,812,850 A | * | 9/1998 | Wimble ...................... 717/131 |
| 6,363,474 B1 | * | 3/2002 | McCulley et al. ........... 712/202 |
| 6,993,663 B1 | | 1/2006 | Paya et al. |
| 7,120,794 B2 | | 10/2006 | Kelley et al. |
| 7,966,466 B2 | | 6/2011 | Kershaw et al. |
| 7,984,257 B2 | | 7/2011 | Funk et al. |
| 2002/0099933 A1 | | 7/2002 | Nevill et al. |
| 2004/0139346 A1 | * | 7/2004 | Watt et al. .................. 713/200 |
| 2004/0187117 A1 | | 9/2004 | Orion et al. |
| 2005/0044292 A1 | | 2/2005 | McKeen |
| 2005/0177666 A1 | * | 8/2005 | Kimelman et al. .......... 710/200 |
| 2006/0224866 A1 | | 10/2006 | Grisenthwaite et al. |
| 2007/0204259 A1 | | 8/2007 | Wilner et al. |
| 2008/0250216 A1 | | 10/2008 | Kershaw et al. |
| 2010/0057960 A1 | * | 3/2010 | Renno ......................... 710/110 |
| 2011/0225402 A1 | | 9/2011 | Grisenthwaite |
| 2012/0036341 A1 | * | 2/2012 | Morfey et al. ............... 712/229 |

OTHER PUBLICATIONS

Cocke et al., Scheme to Improve the Call/Return Performance on the RS/6000, Jul. 1, 1993, IBM, pp. 143-145.*
U.S. Appl. No. 13/680,352, filed Nov. 19, 2012, Grocutt et al.
U.S. Appl. No. 13/680,298, filed Nov. 19, 2012, Grocutt.
International Search Report and Written Opinion of the International Searching Authority dated May 7, 2013 in PCT/GB2013/050102.
International Preliminary Report on Patentability dated Aug. 21, 2014 in PCT/GB2013/050029, 6 pages.
UK Search Report for GB Application No. 1220771.8, dated Dec. 13, 2012.
International Search Report and Written Opinion of the International Searching Authority mailed Oct. 7, 2013 in PCT/GB2013/052107.
International Search Report and Written Opinion of the International Searching Authority mailed Sep. 27, 2013 in PCT/GB2013/052108.
ARM Limited, "Cortex-M3 Technical Reference Manual" Revision: r1p1, 2005, 42 pages.
Office Action mailed Dec. 2, 2014 in co-pending U.S. Appl. No. 13/368,419, 74 pages.
Office Action mailed Dec. 26, 2014 in co-pending U.S. Appl. No. 13/680,352, 38 pages.
Office Action mailed Dec. 4, 2014 in co-pending U.S. Appl. No. 13/680,298, 44 pages.
ARM Limited, Cortex-M3, Revision: r1p1, Technical Reference Manual, 2006, ARM Limited, downloaded from http://infocenter.arm.com/help/topic/com.arm.doc.ddi0337e/DDI0337E_cortex_m3_r1p1_trm.pdf on Oct. 2, 2014, pp. 1-22, 2, 3, 5-2, 5-9, 5-10, 5-11 and 5-22 (384 pages).
ARM Limited, ARM Procedure Call Standard for the ARM Architecture, Oct. 16, 2009, release 2.08, downloaded from https://web/eecs/umich/edu/~prabal/teaching/eecs373-f11/readings/ARM-AAPCS-EABI-v2.08.pdf on Dec. 14, 2014, 34 pages.
ARM Limited, Corex-M3 Technical Reference Manual, Jun. 13, 2007, ARM Limited, Revision r1p1, Chapters 5, 10 and 11, downloaded from http://infocenter.arm.com/help/topic/com.arm.doc.ddi0337e/DDI0337E_cortex_m3_r1p1_irm.pdf, 97 pages.
International Preliminary Report on Patentability dated Jan. 29, 2014 in PCT/GB2013/050102, 23 pages.
U.S. Appl. No. 13/368,419, filed Feb. 8, 2012, Grocutt et al.
International Preliminary Report on Patentability dated Oct. 7, 2014 in PCT/GB2013/052107, 6 pages.
International Preliminary Report on Patentability dated Apr. 16, 2015 in PCT/GB2013/052108, 6 pages.
Office Action mailed Jun. 22, 2015 in co-pending U.S. Appl. No. 13/368,419, 79 pages.

* cited by examiner

|  |  |  | Stack operations to be performed when a second exception occuring during:- ||
| Original state | exception state || |  |
|  | initial | further | exception entry | exception return |
| secure | secure | secure | Push subset | None |
|  |  | insecure | Push and clear all | Push remaining and clear all |
|  | insecure | secure | Push subset | Pop remaining |
|  |  | insecure | Push and clear all | None |
| insecure | secure | secure | Push subset | None |
|  |  | insecure | Push subset | Clear subset |
|  | insecure | secure | Push subset | None |
|  |  | insecure | Push subset | None | early pre-emption → exception entry
tail chaining → exception return

Key:-
Subset      Tha caller saved subset of the register state
All         Subset and Remaining
Remaining   The callee saved subset of the register state

FIG. 5

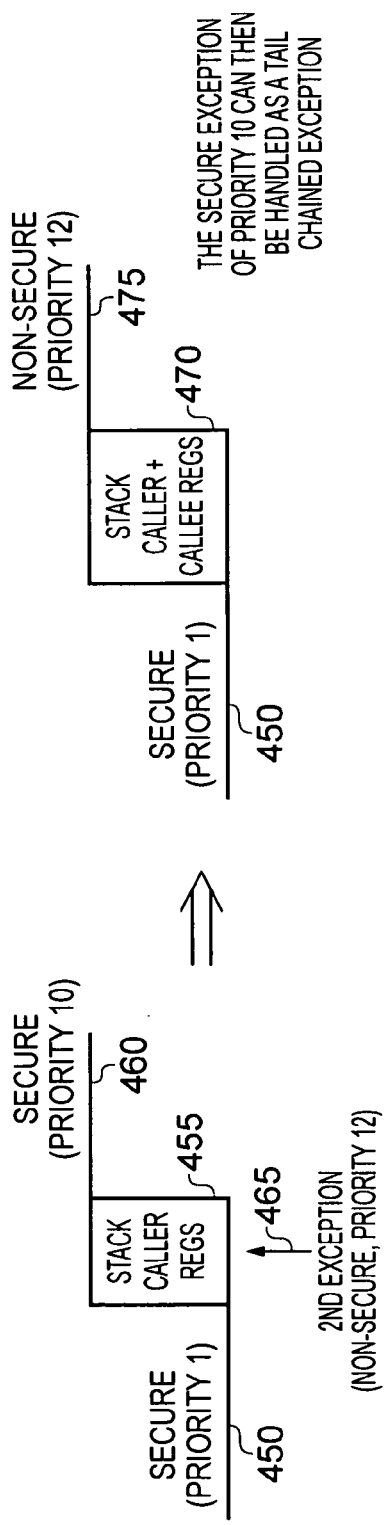
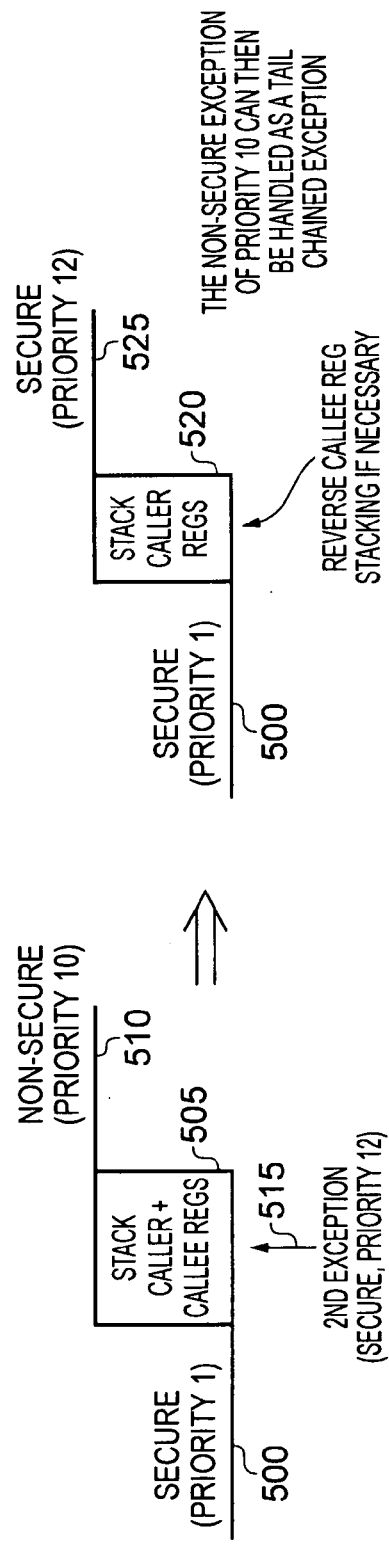
FIG. 9A
FIG. 9B

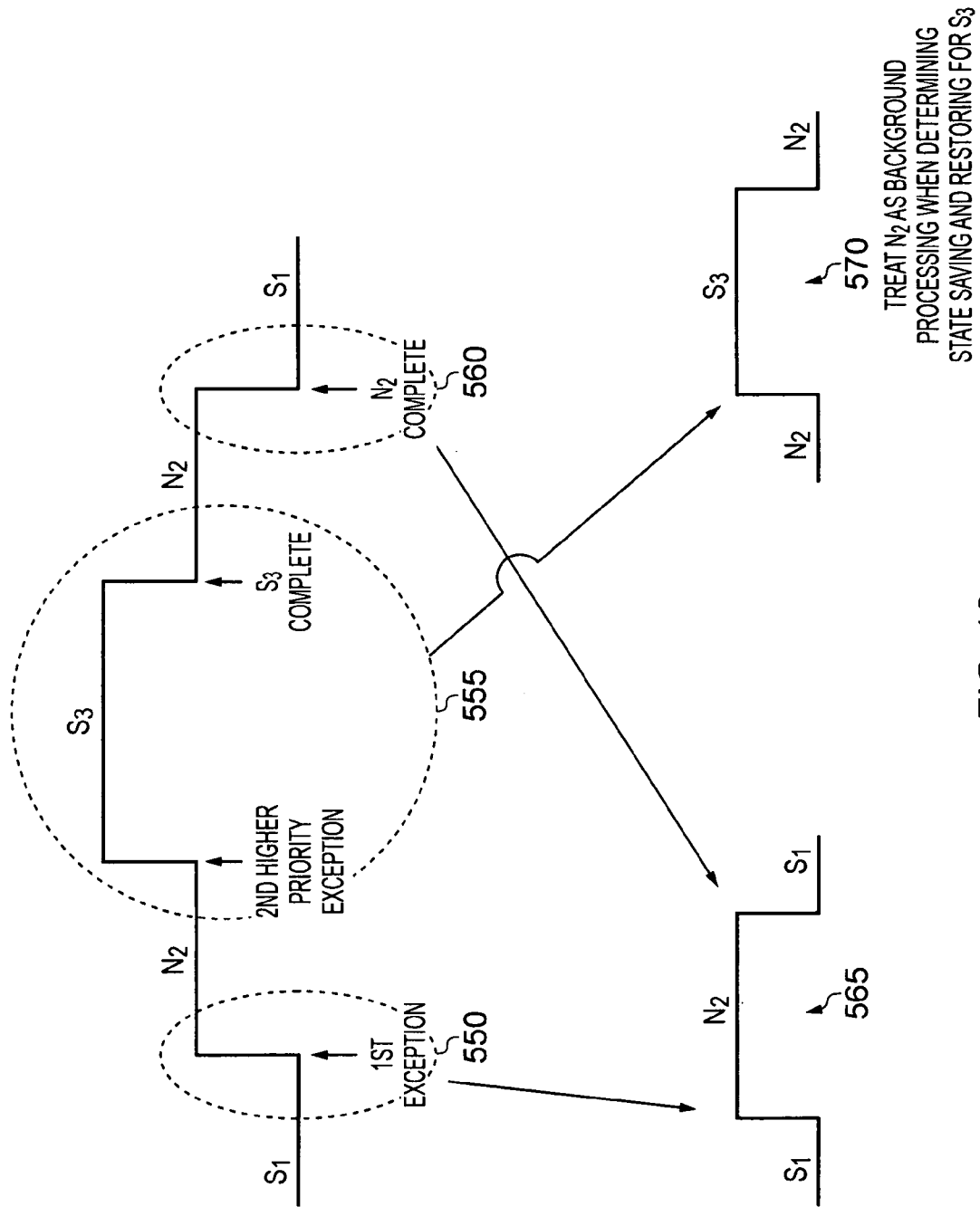

EXCEPTION HANDLING IN A DATA PROCESSING APPARATUS HAVING A SECURE DOMAIN AND A LESS SECURE DOMAIN

CROSS-REFERENCE TO RELATED APPLICATION

This application is a Continuation-in-Part of U.S. application Ser. No. 13/368,419, filed 8 Feb. 2012, and claims priority to GB Application No. 1217531.1, filed 1 Oct. 2012, and GB Application No. 1220771.8, filed 19 Nov. 2012, the entire contents of each of which are hereby incorporated by reference.

BACKGROUND OF THE INVENTION

Field of the Invention

The technical field relates to the field of data processing and in particular to to the processing of sensitive data and code.

Description of the Prior Art

Many data processing systems and architectures provide ways of isolating and protecting sensitive data and sections of code from access by unauthorised persons or processes. Although it is important to be able to provide security, there is an overhead in performance and circuit area associated with this protection.

In small systems such as microcontrollers, it is very important that these overheads are kept low, and thus some compromise between level of security and performance may need to be made.

One way of keeping data and code secure is provided by ARM® of Cambridge UK, with their Trustzone architecture where there are secure and non-secure states (also referred to as secure and non-secure domains), and an exception instruction is used to transition between the states, the exception handler protecting the security of the secure side. Although this approach provides a high degree of security, considerable software intervention in the form of the software exception handler is required to change security states which both reduces the performance of the system and increases the amount of effort required to develop an external application program interface API for the secure software as all calls must be proxied through the exception hander. Similarly exceptions that occur whilst in the secure domain that require handling in the non-secure domain also need to be proxied through a secure exception handler, this allowing the secure state to be protected before control passes to the non-secure exception handler.

U.S. Pat. No. 7,966,466 and US 2008/0250216 discloses an alternative secure system where a data store has a secure side and a non-secure side and the location within this data store of the code currently being executed determines the domain the processor is operating in, and thus the data that it is allowed to access.

SUMMARY

Viewed from a first aspect the present invention provides a data processing apparatus comprising: processing circuitry configured to perform data processing operations in response to program code, the processing circuitry comprising exception control circuitry for controlling exception processing; a plurality of registers configured to store data, the registers including a first subset of registers and a second subset of registers; and a data store configured to store data, the data store comprising to a plurality of regions including a secure region and a less secure region, wherein the secure region is for storing data which is accessible by the processing circuitry when operating in a secure domain and not accessible by the processing circuitry when operating in a less secure domain; wherein: in response to an initial exception from background processing performed by the processing circuitry, the exception control circuitry is configured to perform state saving of data from the first subset of registers before triggering the processing circuitry to perform an exception handling routine corresponding to the exception, wherein the exception handling routine has responsibility for performing state saving of data from the second subset of registers; and in response to a first exception causing a transition from the secure domain to the less secure domain, where the background processing was performed by the processing circuitry in the secure domain, the exception control circuitry is configured to perform additional state saving of the data from the second subset of registers before triggering the processing circuitry to perform the exception handling routine in the less secure domain.

When an exception occurs during background processing, the background processing may have placed data values in registers, and so to allow these data values to be retained and restored when the exception is finished, the system may perform state saving of the data from the registers to the data store (typically to a stack provided in the data store). As discussed above, for some systems it is important to achieve a compromise between the level of security achieved and the processing performance. This is also true when performing the state saving in response to an exception.

For performance reasons, it can be useful to perform the state saving of the data in the registers in a first subset and a second subset. In accordance with the present invention, state saving of data from the first subset can be performed by exception control circuitry in hardware before triggering the exception handling routine. In contrast, the exception handling routine (i.e. software) may have responsibility for performing state saving of data from the second subset of registers.

However, from a security point of view, the state saving of the second subset of registers under control of the exception handling routine could sometimes be problematic. If an exception causes a transition from a secure domain to a less secure domain, following background processing performed in the secure domain, then the exception handling routine could modify the secure data placed in the second subset of registers while in the secure domain.

To prevent this security breach, in accordance with the present invention, if a first exception occurs that causes a transition from the secure domain to the less secure (also referred to herein as the non-secure) domain where background processing was in the secure domain, then the exception control circuitry performs additional state saving of data from the second subset of registers in addition to the first subset, before triggering the exception handling routine in the less secure domain. By providing a hardware mechanism for saving the state of the second subset of registers before triggering the exception handling routine, modification of this data by software in the less secure domain can be prevented.

Hence, the present technique can achieve an improved balance between security and performance when performing state saving in response to exceptions. The hardware mechanism of the present invention enables effective handling of less secure exceptions without requiring proxying through a secure exception handler.

In response to the first exception, the exception control circuitry in one embodiment is configured to clear the second subset registers before triggering the processing circuitry to perform the exception handling routine. This means that the exception handling routine in the less secure domain cannot access any data placed in the second subset of registers while in the secure domain.

Further, in one embodiment, in response to said first exception, the data processing apparatus is configured to ensure that the first subset of registers does not contain secure data, before the exception control circuitry triggers the processing circuitry to perform the exception handling routine. There are a number of ways in which this can be achieved. For example, either the hardware or software may ensure that the first subset of registers is cleared so that those registers do not contain any secure data. Alternatively, it may be the case that the first subset of registers can be engineered so as only to include non-secure data prior to the processing circuitry being triggered to perform the exception handling routine, in which case it may not be necessary to clear the first subset of registers.

In the present application, the terms "caller registers" and "callee registers" may be used to indicate the first subset and second subset of registers, respectively.

While the exception handling routine has responsibility for performing state saving of the data from the second subset of registers (the callee registers), it is not always essential for the exception handling routine to actually perform the state saving of the data from the second subset. For example, if the exception control circuitry has already performed the additional state saving of the second subset of registers, then the exception handling routine could omit the state saving of these registers.

Alternatively, it may be simpler for the exception handling routine to always perform the state saving of the data from the callee registers, even if the additional state saving has already been carried out by the hardware. As the registers may already be cleared by the hardware, the exception handling routine will not have access to any secure data values previously held in the callee registers anyway, and the overhead associated with saving the cleared data values to the less secure region of the data store and restoring the cleared data values later on (when the exception completes) may be less than the overhead associated with providing a mechanism for allowing the exception handling routine to detect whether the hardware has already performed the additional state saving.

Regarding the first subset of registers (caller registers) and the second subset registers (callee registers), it is possible in one embodiment for the first subset of registers to comprise zero registers so that all of the registers that need to be preserved around exception handlers are in the second subset. In this case, for most exceptions no state saving would be performed by the exception control circuitry, with the exception handling routine having responsibility for saving all the registers in the second subset. However, in response to the first exception causing a transition from the secure domain to the less secure domain, the additional state saving may save the second subset (all the registers that need to be preserved) in hardware using the exception control circuitry, to prevent access to this data by the exception handling routine in a less secure domain.

It is possible for a further exception to be pending at the time when a current exception has completed. In this case, the processing circuitry may service the further exception before returning to the background processing which was being performed before the current exception. This situation is referred to as "tail-chaining" and the further exception is referred to as a "tail-chained" exception.

The first exception which triggers the additional state saving may be the initial exception which occurs while the processing circuitry is performing background processing. Alternatively, the first exception may itself be a tail-chained exception which is processed after the initial exception but before returning to the background to processing.

In the present application, the term "background processing" is used to indicate the processing which was interrupted by an exception of a higher priority. If an exception handling routine is itself interrupted by a higher priority exception (referred to herein as a pre-empting exception), then the exception handling routine that was interrupted may itself become the "background processing" for the pre-empting exception, and the pre-empting exception may then trigger the state saving of data being used by the exception handling routine prior to being interrupted.

In one embodiment where tail chaining is used, it is possible to reduce the amount of state saving required in connection with tail chained exceptions. In particular, in one embodiment, the exception control circuitry is configured, in response to a new exception of lower priority than a current exception whose corresponding exception handling routine is still being performed, to control processing of the new exception as a tail-chained exception before causing the processing circuitry to return to the background processing. Further, the exception control circuitry is configured to perform no further state saving operations when controlling processing of the new exception except where said current exception is executed in said secure domain, said new exception indicates switching to said less secure domain, and said background processing was performed in said secure domain, whereupon said exception control circuitry is configured following completion of the exception handling routine for said current exception, to perform said additional state saving of the data from said second subset of registers and ensure said second subset of registers are cleared before triggering the processing circuitry to perform the exception handling routine corresponding to the new exception. As mentioned earlier, clearing of the first subset of registers may or may not be necessary dependent on implementation. Such an approach allows the security of the data to be maintained when a non-secure tail chained exception follows a secure exception which itself caused an interruption in secure background processing.

Further efficiencies can also be made in relation to state restoring operations when handling tail chained exceptions. For example, in one embodiment, the exception control circuitry is configured to perform no state restoring operation when controlling processing of the new exception except where said current exception is executed in said less secure domain, said new exception indicates switching to said secure domain, and said background processing was performed in said secure domain, to whereupon said exception control circuitry is configured following completion of the exception handling routine for said current exception, to perform a state restoring operation of the data into said second subset of registers before triggering the processing circuitry to perform the exception handling routine corresponding to the new exception.

As mentioned earlier, higher priority exceptions occurring whilst the current exception is being processed are handled as pre-empting exceptions. If such a pre-empting exception occurs early on in the handling of a current exception, and in particular whilst the exception control circuitry is still handling the earlier mentioned state saving or additional state saving operations prior to triggering the processing circuitry to perform an exception handling routine for the current exception, then the state saving and additional state saving operations of the exception control circuitry can in one embodiment be modified. In particular, in one embodiment, if a pre-empting exception having a higher priority than said first exception occurs while performing the additional state saving of the second subset of registers, and the pre-empting exception does not require a transition from the secure domain to the less secure domain, the exception control circuitry is configured to reverse the additional state saving before triggering the processing circuitry to process the exception handling routine of the pre-empting exception.

Alternatively, or in addition, if a current exception does not cause a transition from the secure domain to the less secure domain, and if a pre-empting exception having a higher priority than the current exception and requiring a transition from the secure domain to the less secure domain occurs before processing of the exception handling routine associated with the current exception begins, the exception control circuitry may be configured to additionally perform the additional state saving of the data from the second subset of registers before triggering the processing circuitry to process the exception handling routine of the pre-empting exception.

If the pre-empting exception occurs after the exception control circuitry has performed any required state saving or additional state saving in respect of the current exception, and the processing circuitry has been triggered to perform the exception handling routine for that current exception, but occurs before that exception handling routine has completed, then in one embodiment the exception control circuitry is configured to treat the current exception as said background processing when determining whether said state saving of said first subset of registers, or of said first and second subsets of registers is required before triggering the processing circuitry to perform the exception handling routine of the pre-empting exception.

In one embodiment, the data store comprises a plurality of stacks including a secure stack in the secure region and a less secure stack in the less secure region. In such embodiments, when performing the state saving of data from the first subset of registers and the additional state saving of data from the second subset of registers, the exception control circuitry is configured to save the data to the one of the secure stack and the less secure stack corresponding to the security of the domain in which the processing circuitry was operating when performing said background processing.

In one embodiment, the data processing apparatus further comprises a secure configuration storage location for storing a secure configuration value indicating which of said plurality of registers are available for use by currently executing code for storing secure data, wherein in response to an exception causing the transition from the secure domain to the less secure domain, the exception control circuitry is configured to include within said second subset of registers one or more of the registers indicated by said secure configuration value. This hence allows some configurability as to the registers forming at least the second subset of registers, and hence some configurability as to which registers are subjected to the additional state saving operation performed by the exception control circuitry.

In one embodiment, the data processing apparatus further comprises a storage location for storing an exception return value, said processing circuitry being configured to set a domain value within said exception return value to indicate the domain said data processing apparatus is operating in on taking an initial exception from said background processing, said exception control circuitry determining which of said registers should be subjected to state saving or state restoring operations in dependence upon said domain value. This provides a simple mechanism for allowing the exception control circuitry to determine whether state saving and/or additional state saving is required in any particular situation.

Viewed from a second aspect, the present invention provides a data processing apparatus comprising: data processing circuitry for performing data processing operations in response to program code; a plurality of registers; and a data store for storing data, said data store comprising a plurality of regions each region having a secure level, and comprising at least one secure region for storing sensitive data accessible by said data processing circuitry operating in said secure domain and not accessible by said data processing circuitry operating in a less secure domain and a less secure region for storing less secure data; said data store comprising at least two stacks a secure stack in said secure region and a less secure stack in said less secure region; wherein said data processing circuitry comprises exception handling circuitry, said exception handling circuitry being configured to respond to receipt of an exception when said data processing circuitry is executing in said secure domain and said exception indicates switching to executing program code in a less secure domain to clear a set of said registers, said registers within said set of said registers depending on a secure level of said domain of execution and said domain said exception is to be taken in.

In one such embodiment, the data processing circuitry is further configured to save state stored in said set of said registers to said stack of said domain said data processing circuitry is executing in prior to clearing said set of said registers.

Furthermore, in one embodiment, the data processing apparatus comprises a secure configuration storage location for storing a value indicating which of said plurality of registers are available for use by currently executing code for storing secure state, said data processing circuitry being configured to determine which registers are within said set of registers in dependence upon said plurality of registers indicated by said secure configuration value and a secure level of said domain of execution and said domain said exception is to be taken in.

Viewed from a third aspect, the present invention provides a method of processing data on a data processing apparatus, said data processing apparatus comprising processing circuitry for performing data processing operations in response to program code, the processing circuitry comprising exception control circuitry for controlling exception processing, a plurality of registers for storing data, the registers including a first subset of registers and a second subset of registers, and a data store for storing data, the data store comprising a plurality of regions including a secure region and a less secure region, wherein the secure region is for storing data which is accessible by the processing circuitry when operating in a secure domain and not accessible by the processing circuitry when operating in a less secure domain, said method comprising: in response to an initial exception from background processing performed by the processing circuitry, employing the exception control circuitry to perform state saving of data from the first subset of registers before triggering the processing circuitry to perform an exception handling routine corresponding to the exception, wherein the exception handling routine has responsibility for performing state saving of data from the second subset of registers; and in response to a first exception causing a transition from the secure domain to the less secure domain, where the background processing was performed by the processing circuitry in the secure domain, employing the exception control circuitry to perform additional state saving of the data from the second subset of registers before triggering the processing circuitry to perform the exception handling routine in the less secure domain.

Viewed from a fourth aspect, the present invention provides a data processing apparatus comprising: processing means for performing data processing operations in response to program code, the processing means comprising exception control means for controlling exception processing; a plurality of register means for storing data, including a first subset of register means and a second subset of register means; and data store means for storing data, the data store means comprising a plurality of regions including a secure region and a less secure region, wherein the secure region is for storing data which is accessible by the processing means when operating in a secure domain and not accessible by the processing means when operating in a less secure domain; wherein: in response to an initial exception from background processing performed by the processing means, the exception control means performs state saving of data from the first subset of register means before triggering the processing means to perform an exception handling routine corresponding to the exception, wherein the exception handling routine has responsibility for performing state saving of data from the second subset of register means; and in response to a first exception causing a transition from the secure domain to the less secure domain, where the background processing was performed by the processing means in the secure domain, the exception control means performs additional state saving of the data from the second subset of register means before triggering the processing means to perform the exception handling routine in the less secure domain.

BRIEF DESCRIPTION OF THE DRAWINGS

The present invention will be described further, by way of example only, with reference to embodiments thereof as illustrated in the accompanying drawings, in which:

FIG. 5 is a table showing the state that is saved when an initial exception and then a further exception are received, in accordance with one embodiment;

FIGS. 9A and 9B illustrate two early pre-emption scenarios in accordance with one embodiment;

FIG. 10 schematically illustrates a decomposition technique which can be used when handling pre-empting exceptions in accordance with one embodiment;

DESCRIPTION OF EXAMPLE NON-LIMITING EMBODIMENTS

Figure 1:
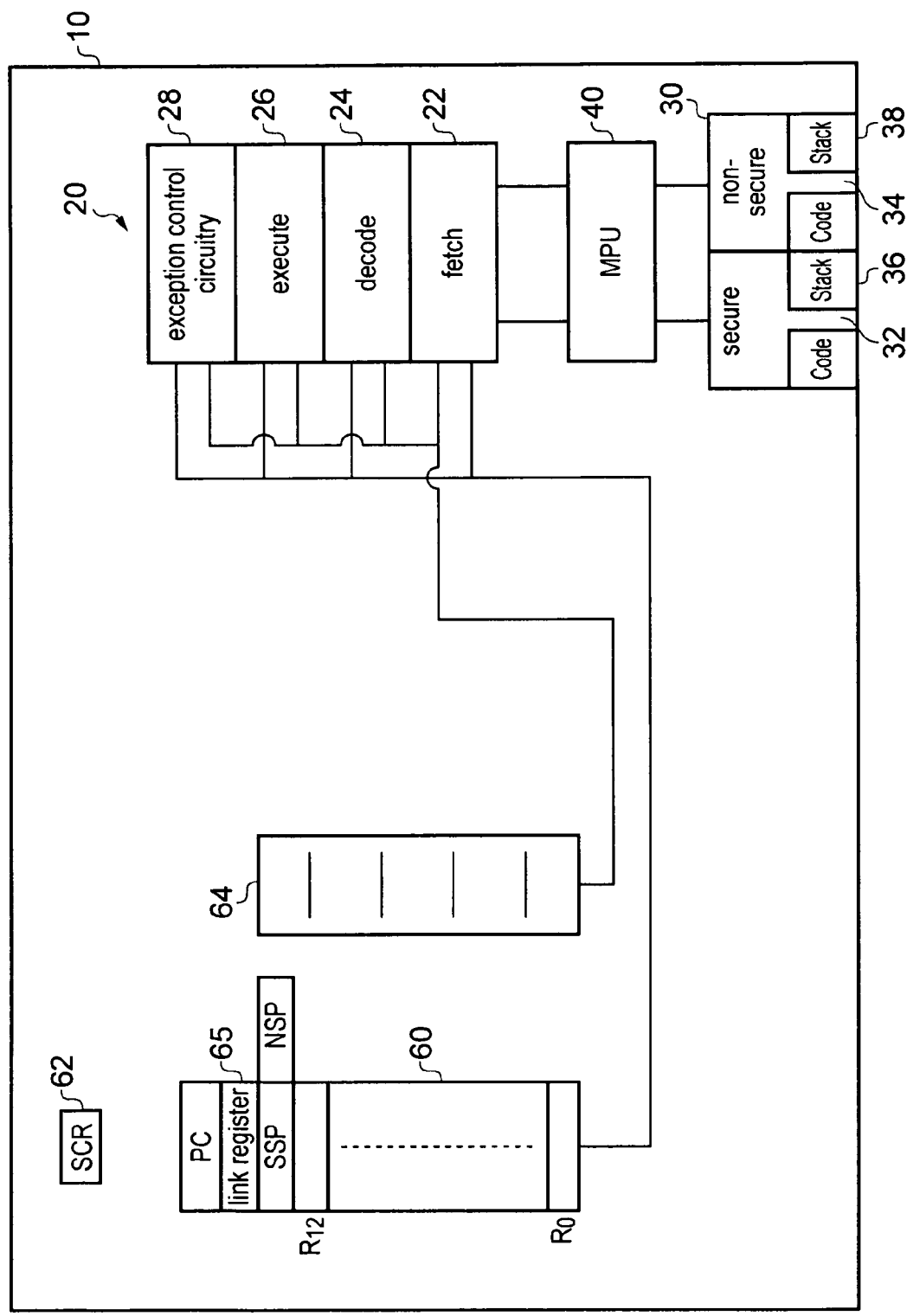
FIG. 1 shows a data processing apparatus according to one embodiment, having a data store with secure and non-secure regions.

FIG. 1 shows a data processing apparatus 10 which may for example be a microcontroller. It comprises processing circuitry 20 for processing instructions and a data store 30 for storing data that is processed by the processing circuitry 20 and also for storing the program code that the processing circuitry 20 executes.

Data store 30 has two regions of different security, a secure region 32 and a non-secure region 34 (also referred to herein as a less secure region). Data stored in the secure region 32 is not accessible to code that is stored in the non-secure region 34 when it is executing.

Data processing apparatus 10 also has a memory protection unit MPU 40 which controls access to the secure 32 and the non-secure 34 regions. Although this control may be performed through a memory protection unit, it may in other embodiments be done in a more distributed fashion by circuitry within the processing apparatus that monitors the region code that is currently being executed is stored in, and controls access to the different regions of the memory in dependence upon this.

In this embodiment, the security of the domain that the processing circuitry 20 is executing in is determined from the region that the code currently being executed is stored in (other techniques for determining the current domain of operation are also possible). Thus, secure program code stored in secure data store 32 is executed in the secure domain and uses secure stack 36 to store data values in. Similarly non-secure code stored in non-secure data store 34 is executed in the non-secure domain (also referred to herein as the less secure domain) and uses non-secure stack 38 for storing data values during execution.

Processing circuitry 20 has fetch circuitry 22 for fetching instructions to be executed. It also has decode circuitry 24 for decoding these instructions and execution circuitry 26 for executing them. Instructions to be executed are fetched by fetch circuitry 22 from data store 30 via the memory protection unit MPU 40. The instructions and data are retrieved via MPU 40 which controls the access to the secure and the non-secure regions and isolates the secure data from the non-secure side.

In this embodiment there is a register bank 60 which has general purpose registers which are used during data processing. These general purpose registers have a program counter PC which indicates which instruction is the next to be executed, and a stack pointer SP which indicates at which point in the stack the current stack frame is located. In this embodiment, as there is a stack in the secure side and a stack in the non-secure side, there is a secure stack pointer SSP and a non-secure stack pointer NSP, but only one of these is directly visible to the program being executed at any one time. It should be noted that in some embodiments there may be plural stack pointers for each stack but again only one will be visible at any one time. There are also general purpose registers in register bank 60 for storing data values that are being processed by the processing circuitry 20. In this embodiment these are marked as R0 to R12.

Register bank 60 also comprises a link register 65 that may be used to store a return value when an exception is taken or a function is called. The return value allows the system to determine whether a return is an exception return or a function return, and to determine what processing is required on returning from the exception or function. Different kinds of return values may be used, including an exception return (EXC_RETURN) value which indicates an exception return and can include information, such as an indication of the security level of the domain that background processing was processed in, which can enable the processor to determine how to handle the exception return, e.g. which stack to access when restoring state and how many registers need to be loaded.

FIG. 1 also shows an additional register bank 64 which has additional special purpose registers such as floating point registers. In one embodiment, a value can be set in the secure configuration register (SCR) 62 to identify whether any of the registers in the additional register bank 64 can store secure data, and if so those registers will be considered to form part of a set of registers (along with the registers of the register bank 60) that needs to be managed when controlling a transition from the secure domain to the less secure domain, and vice versa.

In accordance with the described embodiment, one mechanism which can be used to transition between the security domains is an exception mechanism. In accordance with this mechanism, on occurrence of an exception, execution of the current software routine will be temporarily halted, and instead execution will branch to an exception handling routine used to process the exception, the exception handling routine used being dependent on the type of exception occurring. Once the exception handling routine has been executed, an exception return will then be used to return back to the original software routine that was temporarily halted as a result of the exception occurring.

Exception control circuitry 28 is provided to control the taking of exceptions, and where these exceptions result in a transition from a more secure to a less secure domain the set of registers that may store sensitive data will be cleared prior to the taking of the exception to avoid data stored in these registers being available to the non-secure side. The state stored in some or all of these registers will be stored on the secure stack under the control of the exception control circuitry 28, such that on return from the exception that state can be restored.

Whilst in FIG. 1 the data store 30 contains a single secure region and a single non-secure region, the techniques described herein are equally applicable to different implementations comprising more than two different security regions.

Also, while FIG. 1 shows the exception control circuitry 28 as being separate from other parts of the processing circuitry 20 such as the execution stage 26, in practice the exception control circuitry 28 may at least partly reuse some elements of the processing circuitry 20 to control processing of exceptions.

Figure 2:
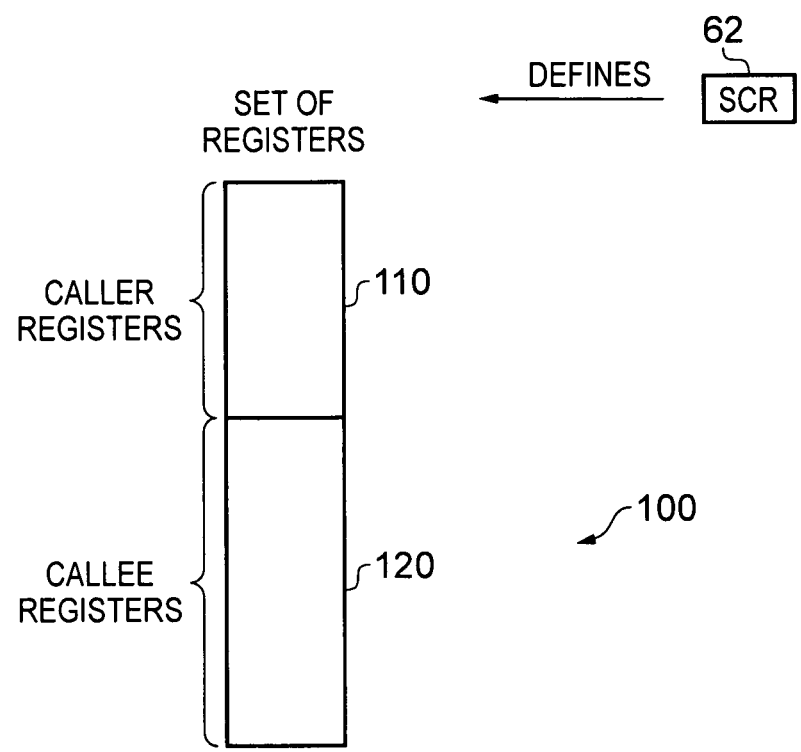
FIG. 2 schematically illustrates how a set of the registers of the data processing apparatus may be partitioned into caller registers and callee registers in accordance with to one embodiment.

The set of registers 100 that needs to be managed when controlling a transition from the secure domain to the less secure domain, and vice versa, is schematically illustrated in FIG. 2. In accordance with the described embodiments, some of these registers are defined as caller registers 110, whilst other of the registers are defined as callee registers 120. The caller registers are those registers that the exception control circuitry 28 will always take responsibility for state saving onto the stack, irrespective of the domain in which the exception handling routine is to execute. By default, the exception handling routine would then have responsibility for state saving the callee registers. In particular, the exception handling routine would then save the state of the callee registers onto the stack associated with the domain in which the exception handling routine is executing. Further, the exception handling routine would then be responsible for restoring the state of those callee registers (typically by copying them from the stack back into the relevant registers) prior to issuing an exception return.

However, in accordance with the described embodiments, in situations where the exception will require a transition from the secure domain to the less secure domain, and the background processing was in the secure domain, the exception control circuitry 28 additionally takes responsibility for state saving the callee registers within a stack frame of the secure stack 36 prior to causing the processing circuitry to transition to execution of the exception handling routine.

As discussed earlier, the content of the SCR register 62 will define which registers may be used to store secure data, and hence which registers need to be contained within the set of registers 100. In one embodiment, the content of the SCR register 62 will identify whether any of the additional special purpose registers 64 are also to be included within the set 100 in addition to the general purpose registers 60.

Figure 3A:
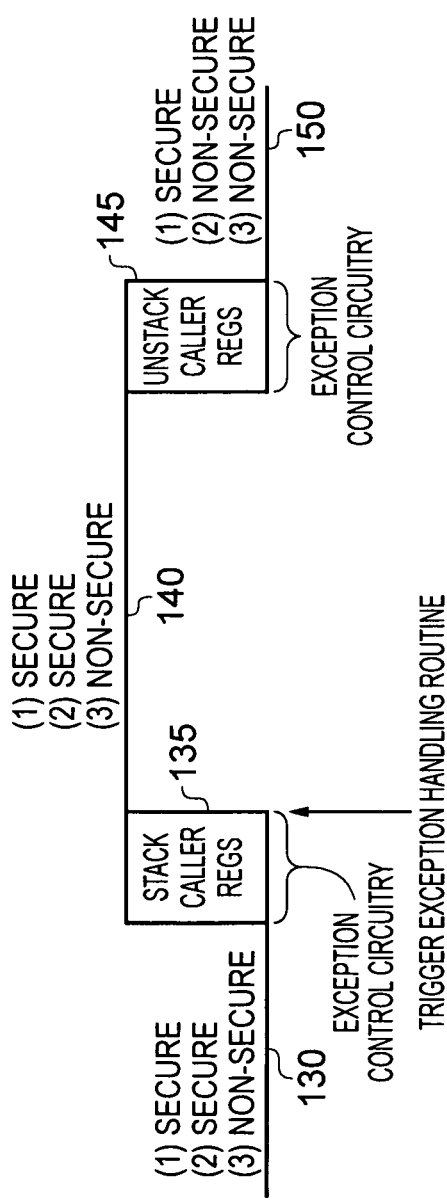
FIGS. 3A and 3B schematically illustrate stacking and unstacking operations performed by the exception control circuitry in accordance with an embodiment.

FIG. 3A illustrates the operation of the exception control circuitry on occurrence of an exception and on subsequent completion of that exception, for three different scenarios. The first of the scenarios is where the background processing is in the secure domain, and the exception is to be processed by an exception handling routine in the secure domain, the second of the scenarios is where the background processing is in the non-secure domain, and the exception is to be processed by an exception handling routine in the secure domain, and the third scenario is where the background processing is in the non-secure domain, and the exception is to be processed by an exception handling routine in the non-secure domain.

In each of these three scenarios, when the background processing 130 is interrupted by the exception, the exception control circuitry 28 is arranged to stack at point 135 the data from the caller registers onto the stack associated with the domain in which the background processing is being performed, prior to triggering the processing circuitry to perform the required exception handling routine 140 in order to process the exception. On completion of the exception, the exception control circuitry also unstacks, at point 145, the previously stacked data from the relevant stack back into the caller registers, prior to resumption of the background processing at point 150.

The exception handling routine will typically have responsibility for stacking data from the callee registers prior to reusing these registers during the exception handling routine, and for later unstacking that data back into the callee registers prior to the end of the exception handling routine.

In the example of FIG. 3A, the caller registers may or may not be cleared by the hardware prior to the exception handling routine being executed, dependent on the particular implementation. In one embodiment, the content of the caller registers will not be cleared, since the three scenarios envisaged either do not result in a transition in the domain when the exception is taken, or only result in a transition from the non-secure to the secure domain, and in one embodiment the secure domain is allowed to see the non-secure data.

Figure 3B:
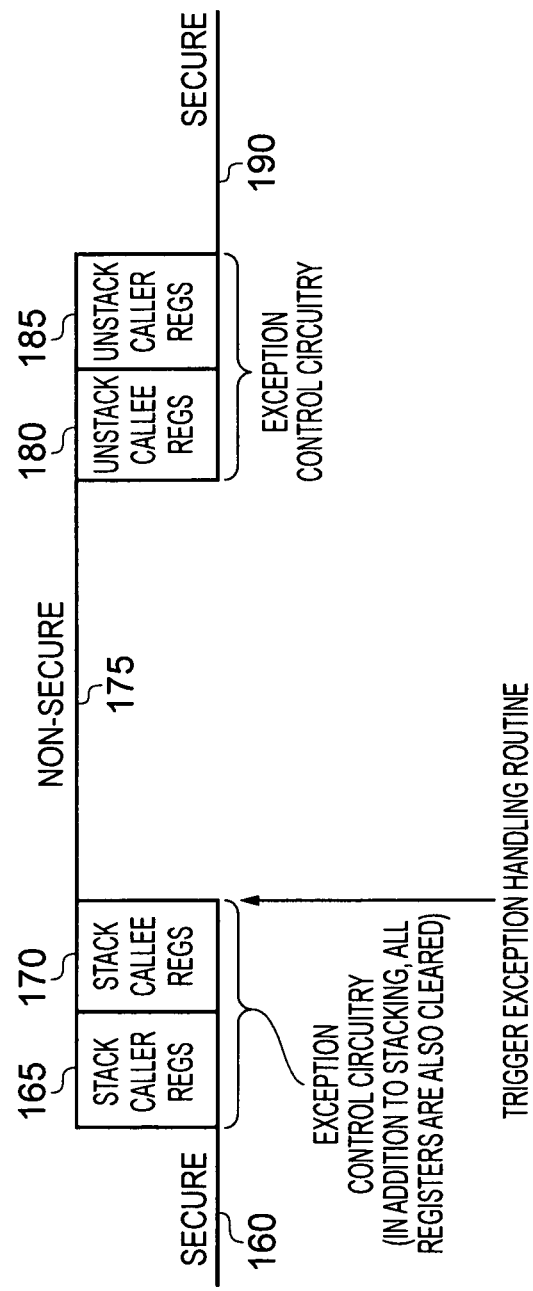

FIG. 3B illustrates the operation of the exception control circuitry on occurrence of an exception and on subsequent completion of that exception, for the scenario where the background processing is being processed in the secure domain, and the exception requires a transition to the non-secure domain. In this example, when the background processing 160 is interrupted by the exception, the exception control circuitry is configured at point 165 to stack the data from the caller registers onto the secure stack, and in addition at point 170 is arranged to stack the data from the callee registers onto the secure stack. The exception control circuitry will then also ensure that the content of the caller and callee registers is cleared prior to to triggering the processing circuitry to perform the exception handling routine 175. Accordingly, in this scenario, the non-secure exception handling routine has no access to the secure data previously held in either the caller or callee registers.

On completion of the exception handling routine, the exception control circuitry will then unstack, at point 180, the previously stacked callee data from the secure stack back into the callee registers, and will also unstack, at point 185, the previously stacked caller data from the secure stack back into the caller registers, prior to resumption of the background processing at point 190.

In one particular embodiment, the non-secure exception handling routine can still be arranged to save the state of the callee registers as usual, but in this scenario those callee registers will be empty, and accordingly the exception handling routine will merely store clear values onto the non-secure stack which it will later restore into the registers prior to issuing the exception return.

As explained above, as a default position in the architecture, part of the register state is automatically saved and restored by the hardware when an exception (for example an interrupt) occurs and completes. By extending such an architecture to save and clear the whole register state or at least all of the register state that the secure domain uses, in the event that the interrupt causes a secure to non-secure transition, the hardware can maintain the security around exceptions.

Figure 4:
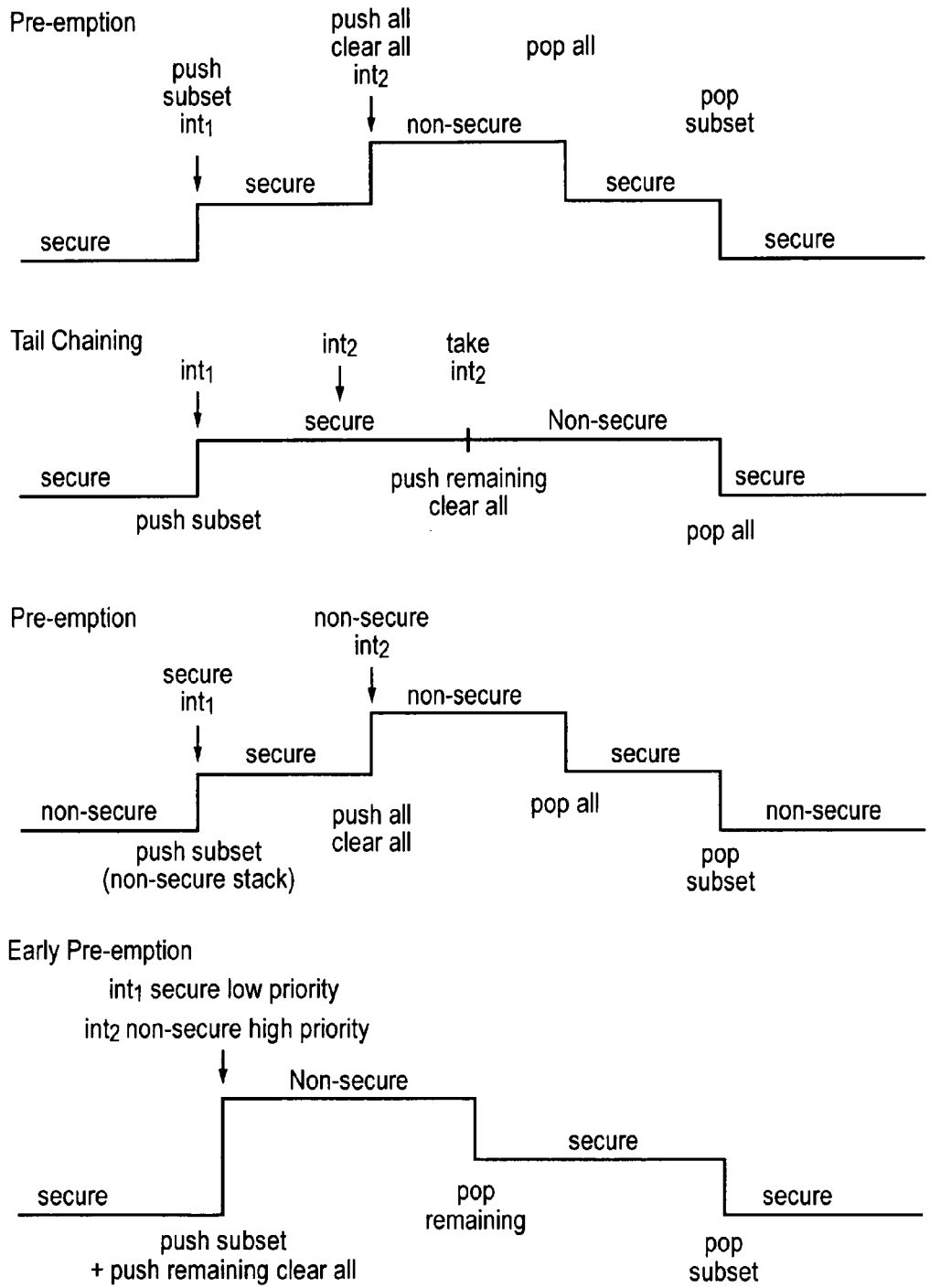
FIG. 4 schematically shows the taking of exceptions (in this example interrupts) for various different scenarios during code execution.

Through use of the above technique, it is possible to remove the requirement to proxy interrupts through the secure state by extending the automatic register stacking system in order to cause the exception control circuitry to push all of the caller and callee registers to the stack (instead of just the caller saved registers), and then to clear their values before switching to the non-secure state and jumping to the exception handling routine (an interrupt vector in the example of an interrupt). To keep the interrupt latency as low as possible, the additional register state is only pushed onto the stack when transitioning from the secure to the non-secure state. This introduces a few complexities when higher priority exceptions (so-called pre-empting exceptions) occur during exception handling, or when processing tail chaining exceptions. FIG. 4 shows some examples.

In the first example background program code is executed in the secure state and a first secure interrupt is received. A subset of the registers (i.e. the caller registers) are saved to the secure stack, and then (whilst the first secure interrupt is still being processed via an appropriate interrupt vector) a second higher priority interrupt that requires handling in the non-secure domain is received. As it requires handling in the non-secure domain, none of the information in the secure registers should be visible to the new interrupt vector routine, and thus all the secure registers (both the caller and callee registers) should be saved to the secure stack and then cleared prior to taking this interrupt. When the second interrupt has completed, processing returns to the non-completed initial secure interrupt, and the registers that were pushed to the secure stack in response to the second interrupt are at that point restored by popping the secure stack. This first secure interrupt can then complete, whereupon the original subset that was pushed to the stack can then be restored by popping the secure stack, prior to resuming the secure background processing.

In the second example the second interrupt has a lower priority than the first interrupt, and accordingly the first interrupt will therefore complete before the non-secure second interrupt is taken. Once the first interrupt has completed then the remaining registers (i.e. the callee registers) are pushed to the secure stack and all the registers are cleared before the non-secure interrupt is taken. Whilst it is important that both the caller and callee registers are cleared at this point, the exception control circuitry may not actually need to clear all registers at this stage, since for example the caller registers may already have been cleared earlier. At the end of the non-secure interrupt all of the registers that have been pushed to the secure stack are restored.

The third example shows non-secure background code that receives a secure interrupt whereupon there is a partial save of the registers (the caller registers) to the non-secure stack. If a second non-secure interrupt is then received with a higher priority, all of the secure registers (caller and callee) will need to be pushed to the secure stack and cleared before it can be taken. When the non-secure interrupt is completed all the secure registers need to be popped from the stack, and then when the secure interrupt is completed the original subset of non-secure registers is popped.

The fourth example shows secure background code that receives a secure interrupt that causes the caller saved registers to be pushed to the secure stack, but before this process is complete a second higher priority non-secure interrupt occurs. This second interrupt causes the remaining registers (i.e. the callee registers) to be pushed onto the secure stack after the caller registers have been stacked, resulting in a push of all the registers being performed. All the registers are then cleared before the non-secure interrupt is taken. Upon completion of this interrupt the callee saved to registers are popped from the secure stack before the secure interrupt is taken. When the secure interrupt is completed, the original caller registers are popped from the secure stack.

FIG. 5 shows a table indicating potential interrupts and the state saving that needs to be performed. In this regard "push subset" is the pushing of the caller saved subset of registers onto the stack, "push remaining" is the pushing of the callee saved subset of registers onto the stack, and "push all" is the pushing of the both the caller and callee register state onto the stack. In this regard, where some registers are not available for storing sensitive data and this is known, then these registers may not need to be pushed onto the stack.

In the table the "exception entry" column identifies what state is pushed onto the stack if a further interrupt that has a higher priority than the initial interrupt occurs before the branch to the initial interrupt's exception vector (which will be referred to herein as an early pre-emption scenario). The "exception return" column identifies what state is pushed, popped or cleared if a further interrupt that has a lower or equal priority to the initial interrupt occurs, and accordingly is not taken until the initial interrupt completes (which will be referred to herein as a tail chaining scenario). Whilst the actions identified in the table are typically actions undertaken by the exception control circuitry hardware 28, the action of clearing the caller registers ("clear subset") associated with tail chaining of a non-secure interrupt following a secure interrupt, in a situation where the background processing was in the non-secure domain, may in fact be performed by software rather than the exception control circuitry hardware.

This may also be the case for at least part of the register clearing (forming part of the "push remaining and clear all" operation) associated with tail chaining of a non-secure interrupt following a secure interrupt, in a situation where the background processing was in the secure domain, where the software could be arranged to clear the caller registers, whilst the hardware would then push and clear the callee registers.

As is apparent from a review of the table of FIG. 5, when transitioning from the secure to the non-secure state, the values in all registers that can save secure state need to be removed from the registers so they are not available to the non-secure side, and thus additional saving and clearing is performed in addition to the usual caller saved register state.

Figure 6:
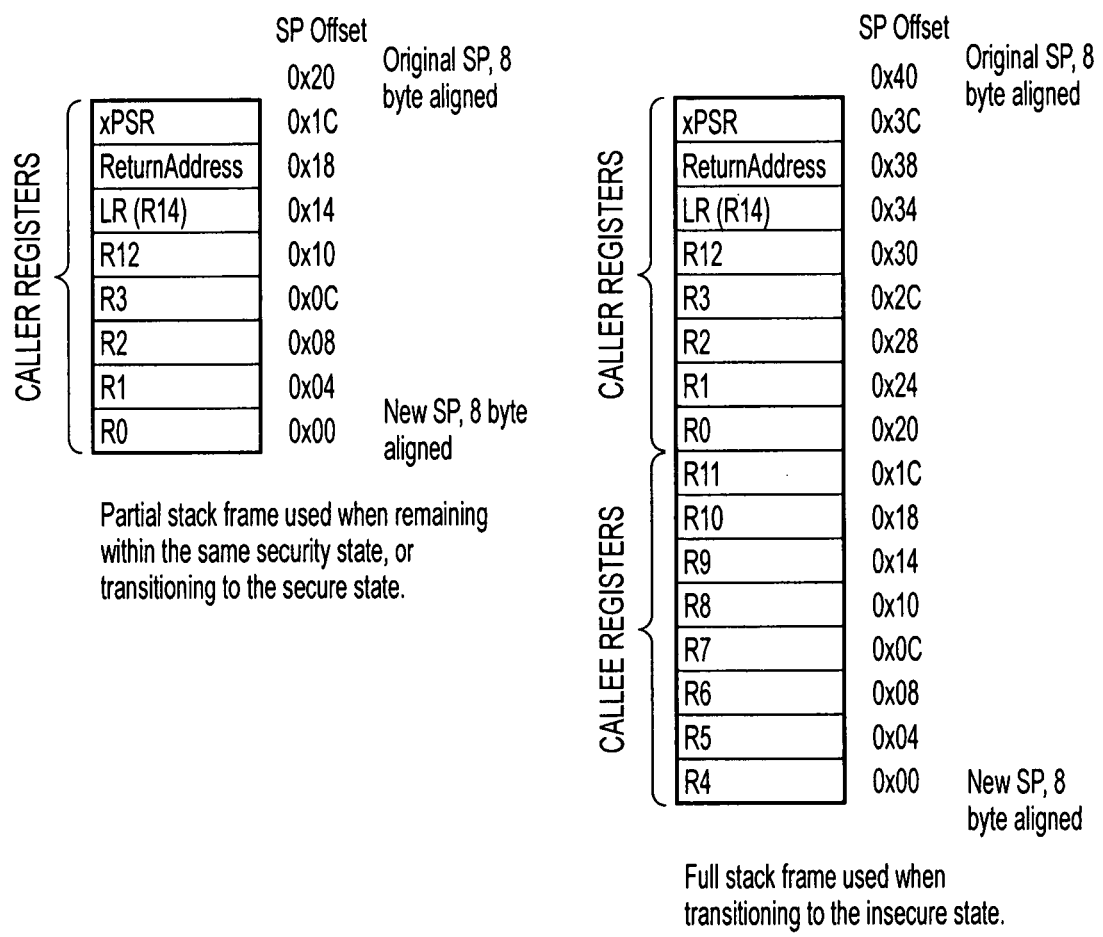
FIG. 6 shows, for an example embodiment, the registers whose states are saved to the stack on taking of an exception, dependent on the domain transition required in order to take the exception.

FIG. 6 shows a stack frame of one embodiment, and in particular the register to contents saved onto a stack frame of the stack when taking an interrupt from the same or less secure state (left-hand side of FIG. 6) and the contents saved onto the stack frame when transitioning to a less secure state (right-hand side of FIG. 6). In this regard, more registers need to be saved and cleared in the latter case as the registers cannot be left storing any state as this is secure state that must not be available to a less secure state.

FIG. 6 identifies which registers are considered to be caller registers and which registers are considered to be callee registers in accordance with the specific embodiment. However, as discussed earlier, exactly which registers need to be included within the caller and callee registers may vary dependent on embodiment, and can be indicated by a value in the secure configuration register 62, such that the saving of state and the clearing of registers required can be determined by using this value. This value may be set by the compiler for a particular apparatus and this allows a particular apparatus to be used in different ways and provides some flexibility in the product. In other embodiments it may be set by software, for example when the system is booting.

As will be noted from the above description, the exception control circuitry automatically pushes and pops the caller saved sections of the register state to the stack when an exception occurs, and if necessary changes which stack pointer and thus which stack is used. This allows the following advantages to be present even in a system with secure and less secure domains: reduced interrupt latency; reduced interrupt jitter; exception handlers can be written in C instead of assembler; it enables optimisations like exception on exception entry, and tail chaining.

Figure 7A:
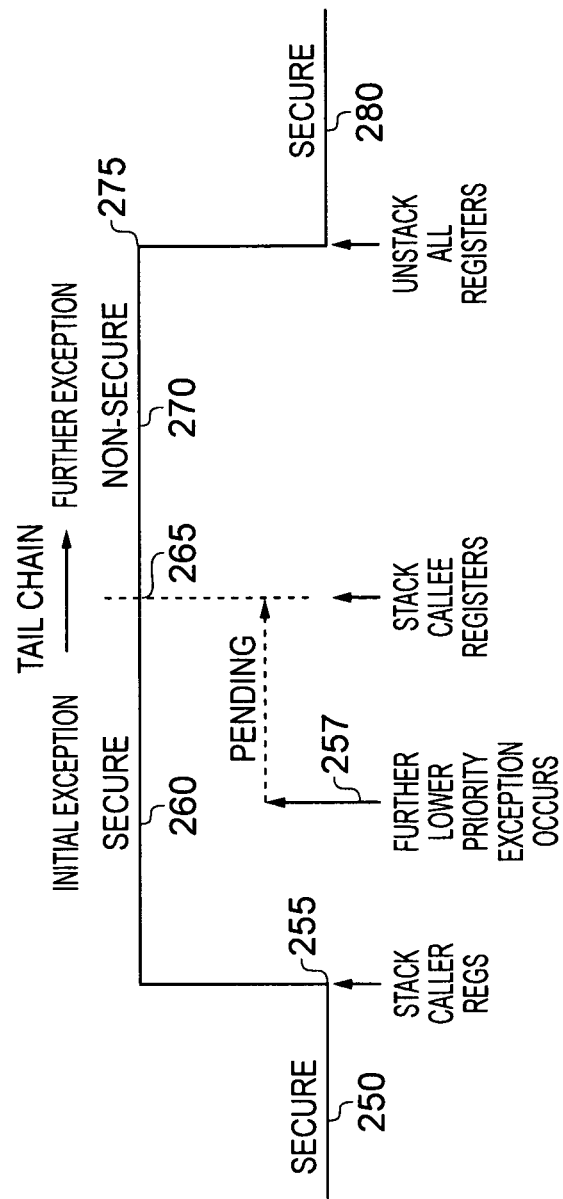
FIGS. 7A and 7B illustrate two example tail chaining scenarios in accordance with one embodiment.
Figure 7B:
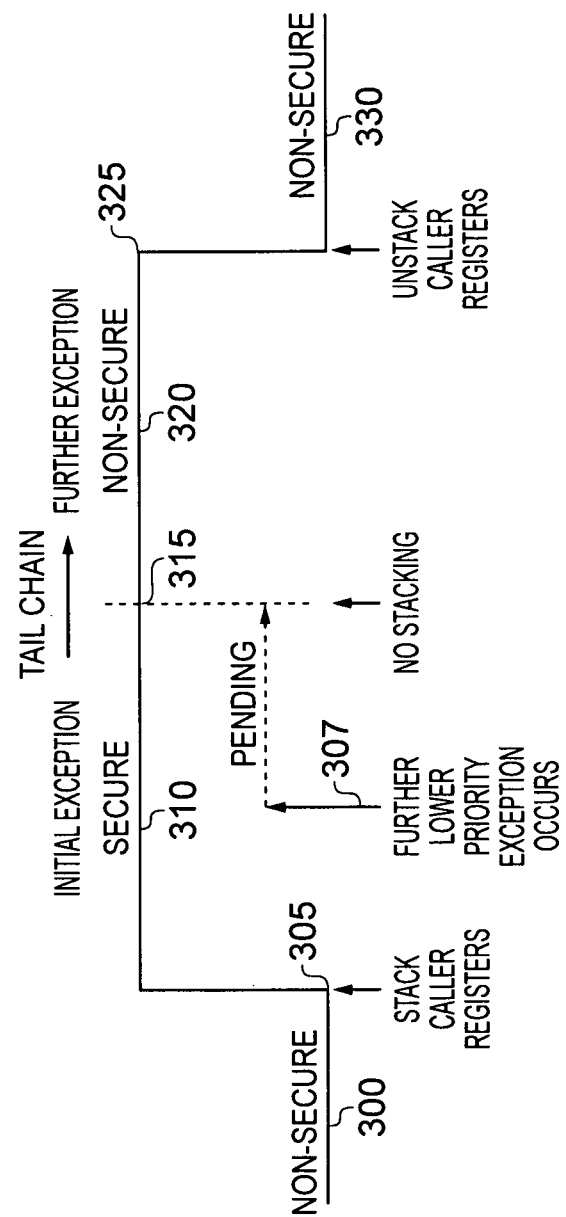

FIGS. 7A and 7B illustrate some specific tail chaining example scenarios. In the example of FIG. 7A, secure background processing is being performed at point 250, but at point 255 an initial exception occurs requiring an exception handling routine to be executed in the secure domain. Accordingly, at point 255, the exception control circuitry stacks the data from the caller registers onto the secure stack, whereafter the exception handling routine is executed at point 260.

At point 257, a further, lower priority, exception occurs, and accordingly that exception remains pending until the initial exception completes at point 265. At this point, the exception control circuitry determines that a transition from the secure to the non-secure domain is required in order to process the further exception, and accordingly at that point stacks the callee registers. It also ensures that the callee registers have been cleared (the caller registers having been cleared earlier, for example by the software), before triggering the processing circuitry to perform the required exception handling routine in the non-secure domain in order to process the further exception at point 270. On completion of the further exception at point 275, the exception control circuitry then unstacks the content for all of the caller and callee registers, prior to resuming background processing at point 280.

FIG. 7B illustrates a similar example, but in this example the background processing at point 300 is in the non-secure domain. When the initial exception occurs at point 305, the exception control circuitry stacks the caller registers as it did in the example of FIG. 7A, before the exception handling routine for the initial exception is then performed at point 310. The further lower-priority exception occurring at point 307 is then held pending until processing of the initial exception ends at point 315. However, at this point, since the background processing was non-secure, the exception control circuitry performs no stacking. As discussed earlier with reference to the table of FIG. 5, an optional step that may be taken at this stage is to clear the caller registers, but this step may alternatively be performed by software instead of the exception control circuitry hardware. Thereafter the exception handling routine for the further exception is processed in the non-secure domain at point 320. On completion of the further exception at point 325, the exception control circuitry unstacks the caller registers prior to returning to background processing at point 330.

In one embodiment, the example of FIG. 7A is the only example where the exception control circuitry has to perform some additional stacking when the further exception is processed as a tail chained exception following completion of the initial exception, and accordingly the overhead of performing stacking is kept to a minimum, whilst preserving the security of the secure data, when handling tail chained exceptions.

Figure 8A:
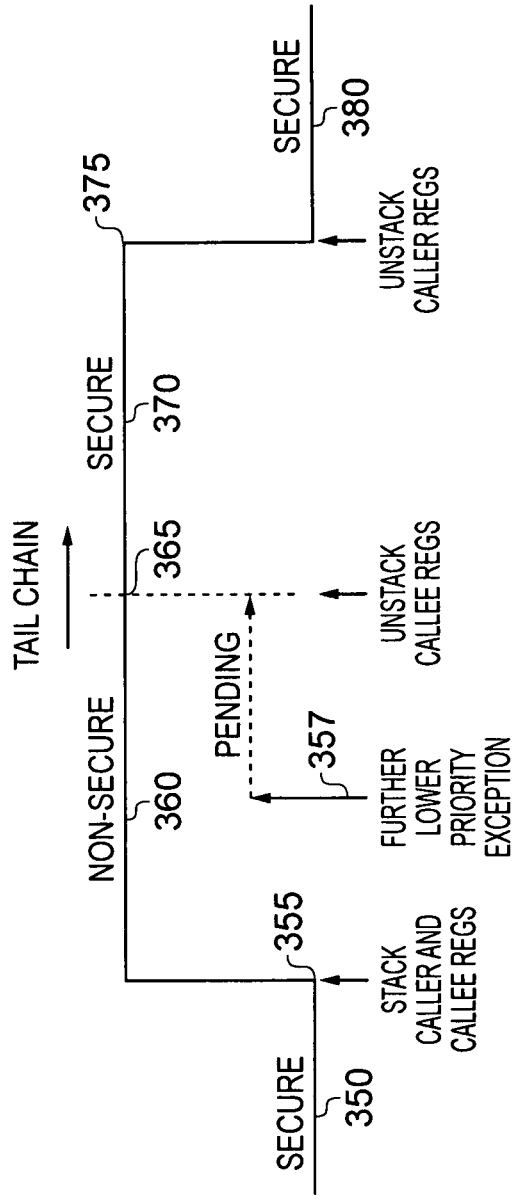
FIGS. 8A and 8B illustrate two further tail chaining scenarios in accordance with one embodiment.
Figure 8B:
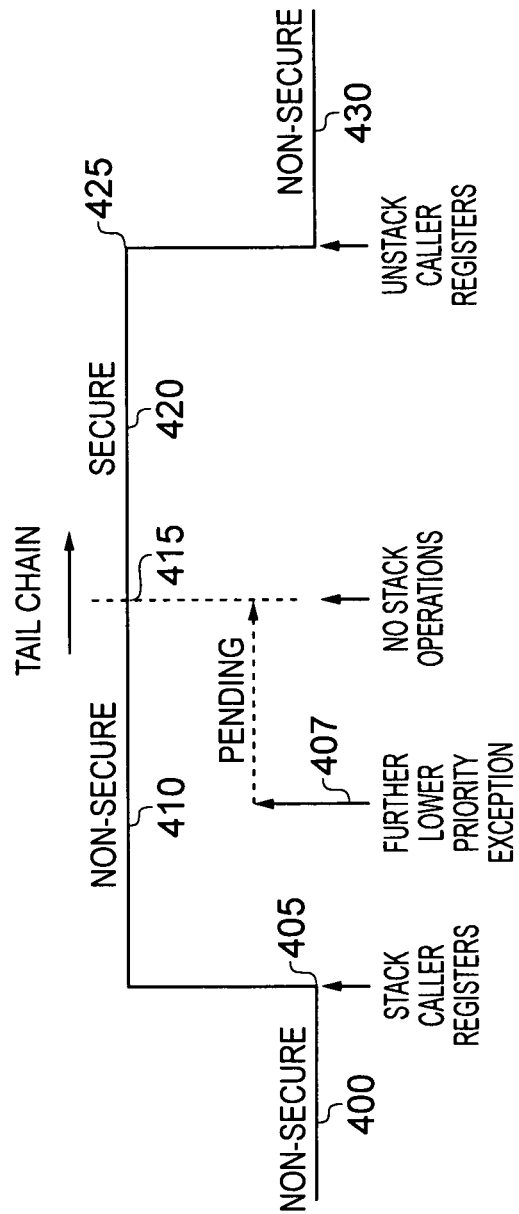

FIGS. 8A and 8B illustrate two further tail chaining examples. In the example of FIG. 8A, secure background processing is being performed at point 350, but at point 355 an initial exception occurs requiring an exception handling routine to be executed in the non-secure domain. Accordingly, at point 355, the exception control circuitry stacks the data from the caller registers and the callee registers onto the secure stack, whereafter the exception handling routine is executed at point 360.

At point 357, a further, lower priority, exception occurs, and accordingly that exception remains pending until the initial exception completes at point 365. At this point, the exception control circuitry determines that a transition from the non-secure to the secure domain is required in order to process the further exception, and accordingly at that point unstacks the callee registers, before triggering the processing circuitry to perform the required exception handling routine in the secure domain in order to process the further exception at point 370. On completion of the further exception at point 375, the exception control circuitry then unstacks the content for the caller registers, prior to resuming background processing at point 380.

FIG. 8B illustrates a similar example, but in this example the background processing at point 400 is in the non-secure domain. When the initial exception occurs at point 405, the exception control circuitry stacks the caller registers, before the exception handling routine for the initial exception is then performed at point 410. The further lower-priority exception occurring at point 407 is then held pending until processing of the initial exception ends at point 415. However, at this point, the exception control circuitry determines that no stack operations are required. Thereafter the exception handling routine for the further exception is processed in the secure domain at point 420. On completion of the further exception at point 425, the exception control circuitry unstacks the caller registers prior to returning to background processing at point 430.

In one embodiment, the example of FIG. 8A is the only example in simple tail chaining situations where the exception control circuitry has to perform an unstacking operation when the further exception is processed as a tail chained exception following completion of the initial exception, and accordingly the overhead of performing unstacking is also kept to a minimum, whilst preserving the security of the secure data, when handling tail chained exceptions.

FIGS. 9A and 9B illustrate two early pre-emption scenarios in accordance with one embodiment. In the example of FIG. 9A, background processing performed at point 450 in the secure domain has a priority level of 1, but on receipt of an exception having a priority level of 10, and requiring processing in the secure domain, the exception control circuitry begins stacking the caller registers at point 455 in preparation for a transition to the secure exception handling routine at point 460. However, prior to completion of stacking of the caller registers, a further exception is received at point 465, which has a higher priority level (in this example a priority level of 12), and requires a transition to the non-secure domain. As shown on the right-hand side of FIG. 9A, at this point the stacking activity of the exception control circuitry is modified so that it stacks both the caller and the callee registers (see point 470), whereafter the processing circuitry is triggered to execute exception handling code for the further exception in the non-secure domain at point 475. Thereafter, the secure exception of priority level 10 can then be handled as a tail chained exception.

In the example of FIG. 9B, background processing performed at point 500 in the secure domain has a priority level of 1, but on receipt of an exception having a priority level of 10, and requiring processing in the non-secure domain, the exception control circuitry begins stacking the caller and callee registers at point 505 in preparation for a transition to the non-secure exception handling routine at point 510. However, prior to completion of stacking of the registers, a further exception is received at point 515, which has a higher priority level (in this example a priority level of 12), and requires a transition to the secure domain. As shown on the right-hand side of FIG. 9B, at this point the stacking activity of the exception control circuitry is modified so that it only stacks the caller registers (see point 520), and if necessary this involves reversing the effect of any callee register stacking that has already taken place (for example by unstacking the data for those affected callee registers). Thereafter, the processing circuitry is triggered to execute exception handling code for the further exception in the secure domain at point 525. Thereafter, the secure exception of priority level 10 can then be handled as a tail chained exception.

FIG. 10 schematically illustrates a decomposition technique which can be used when handling pre-empting exceptions in accordance with one embodiment. Unlike the earlier examples discussed with reference to FIGS. 9A and 9B, it is assumed in the example of FIG. 10 that by the time the pre-empting exception occurs, any state saving associated with the current exception has already taken place, and the processing circuitry has been triggered to execute the necessary exception handling routine. Accordingly, at this point, processing of the current exception handling routine will then need to be interrupted in order to allow the pre-empting exception to be taken.

As shown in FIG. 10, in such scenarios the various hierarchies of pre-empting exception can be decomposed by changing what is viewed as the background processing. In particular, as shown by the transitions 550, 560, these can be decomposed back to the simple case 565, and accordingly when the first exception is taken, the to background processing is the secure processing $S_1$, and ultimately when the first exception is completed, the background processing returned to is again $S_1$. For the second exception, at the time that pre-empting exception is taken, the view of the background processing is changed as illustrated schematically by the dotted circle 555, such that the background processing is considered to be the non-secure processing $N_2$, and hence the exception control circuitry treats that pre-empting exception as the simple case 570. Hence, for the purposes of deciding what state saving and/or restoring is required when taking the exception $S_3$, the exception control circuitry will treat the background processing as being the non-secure processing $N_2$.

Figure 11:
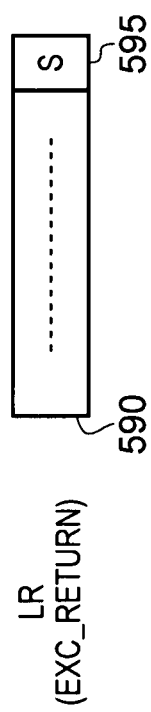
FIG. 11 schematically illustrates the use of the link register to store an exception return value including a security bit in accordance with one embodiment.

As shown in FIG. 11, in one embodiment, in order for the exception control circuitry to be able to determine which stack to restore the register state from when the exception returns, and which domain the processing circuitry should return to, the link register 590 may be set to a special EXC_RETURN value rather than the return address. This EXC_RETURN value may include a security bit that indicates to the processing apparatus the security level of the domain the processing circuitry was in when background processing was being performed prior to the exception being taken. The actual program counter location to return to is stored on the stack of this domain along with the other register state. In this case branching to the EXC_RETURN value indicates that the return address is on the stack and which stack this is.

In one embodiment, the link register 590 need not hold the EXC_RETURN value for the entire time the exception handling routine is being executed, and instead it may be set to this value at the start, and then moved to the stack shortly after. When the exception completes, the software branches to the address indicated by the EXC_RETURN value, which the CPU spots as a special event since it is not a valid instruction address.

If a pre-empting exception is taken, the EXC_RETURN value for the current exception may be stored on the relevant stack (in accordance with the procedures discussed earlier) before a new EXC_RETURN value is set in the link register for the new pre-empting exception (with the security bit S set appropriately having regard to the domain of the current exception whose processing is being interrupted).

Figure 12:
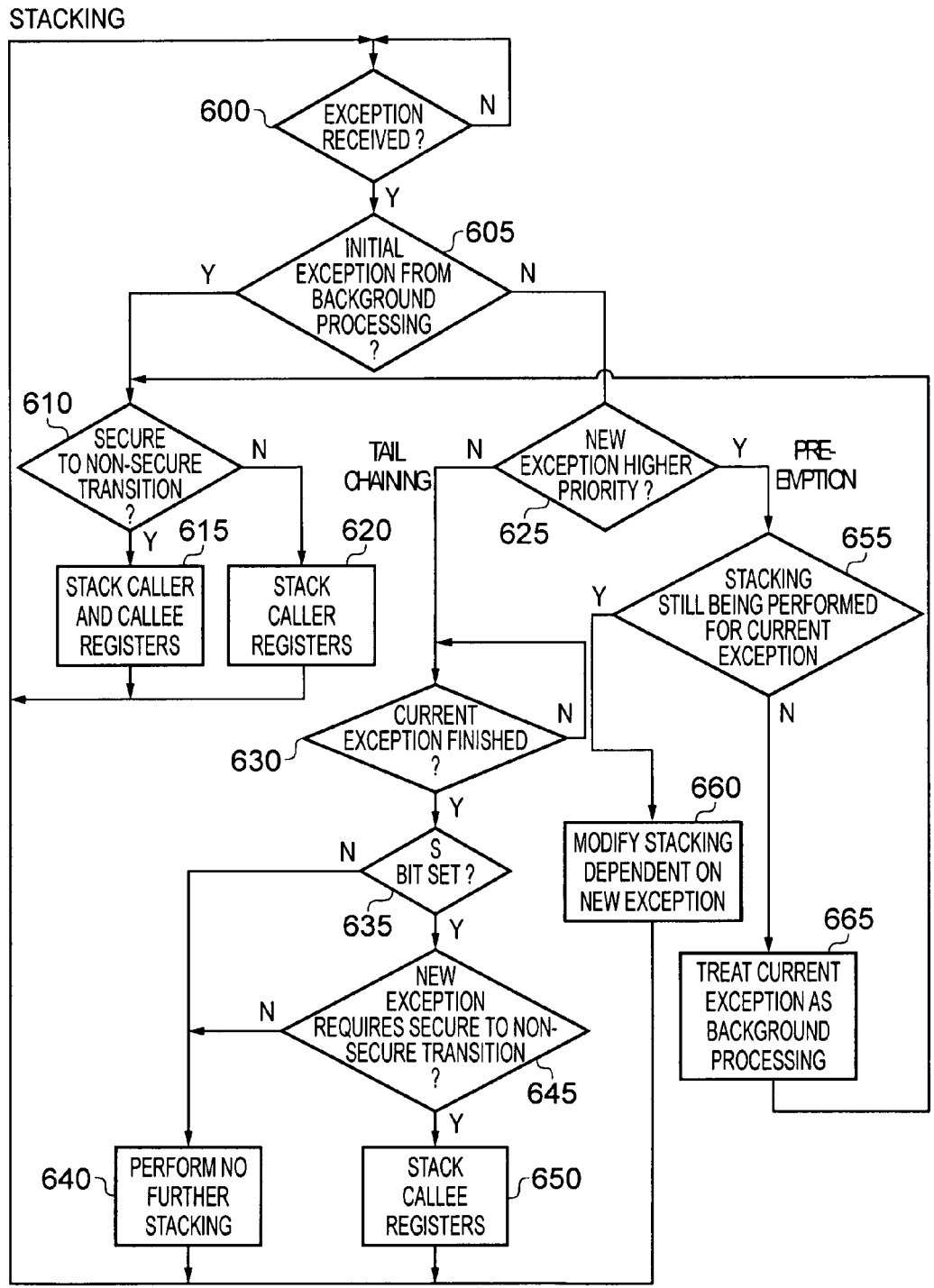
FIG. 12 is a flow diagram illustrating the stacking operations performed on receipt of an exception in accordance with one embodiment.

FIG. 12 is a flow diagram illustrating the stacking operations performed on receipt of an exception in accordance with one embodiment. At step 600, it is determined whether an exception has been received, and if so the process proceeds to step 605, where it is determined whether the processing circuitry is currently performing background processing, and accordingly whether this exception will be an initial exception from that background processing. If it is determined that this exception is the initial exception from background processing, then the process proceeds to step 610, where it is determined whether a secure to non-secure transition will be required when taking the exception (i.e. whether the background processing is in the secure domain, and the required exception handling routine will need to be executed in the non-secure domain). If this is the case, then at step 615 both the caller and callee registers will have their data saved to the secure stack by the exception control circuitry 28. If not, only the caller registers have their data stacked at step 620 by the exception control circuitry, which stack this data is saved to being determined by the domain in which the background processing is being performed. The process then returns to step 600.

If at step 605 it is determined that the exception received at step 600 is not the initial exception from background processing, then the process proceeds to step 625, where it is determined whether this new exception received at step 600 is a higher priority than the existing exception currently being processed. If not, then the new exception will be treated as a tail chained exception, and at step 630 it will be determined whether the current exception has finished. Once the current exception has finished, then at step 635 it is determined whether the S bit 595 is set within the EXC_RETURN value. If it is not, then the process proceeds to step 640, where no further stacking is performed, and the process then returns to step 600.

However, if the S bit is set, indicating that the processing circuitry was operating in the secure domain at the time the initial exception from background processing was taken, then it is determined at step 645 whether the new exception requires a secure to non-secure transition in order for the required exception handling routine to be performed. If not, then again no further stacking is performed at step 640 and the process returns to step 600. However, if a secure to non-secure transition will be required, then the process proceeds to step 650, where the data within the callee registers is also stacked within the secure stack, before the process then returns to step 600.

If at step 625 it is determined that the new exception does have a higher priority than the current exception, then the new exception will be treated as a pre-empting exception. At step 655, it will then be determined whether stacking is still being performed for the current exception. If it is, then at step 660 the stacking behaviour is modified dependent on the new exception, as previously discussed with reference to FIGS. 9A and 9B. Thereafter, the process returns to step 600.

If at step 655, it is determined that stacking is not still being performed for the current exception, and instead the processing circuitry has begun executing the relevant exception handling routine for that current exception, then the process proceeds to step 665, where the current exception is treated as the background processing, and the process then returns to step 610. Accordingly, at step 665, the decomposition technique discussed earlier with reference to FIG. 10 is performed.

Figure 13:
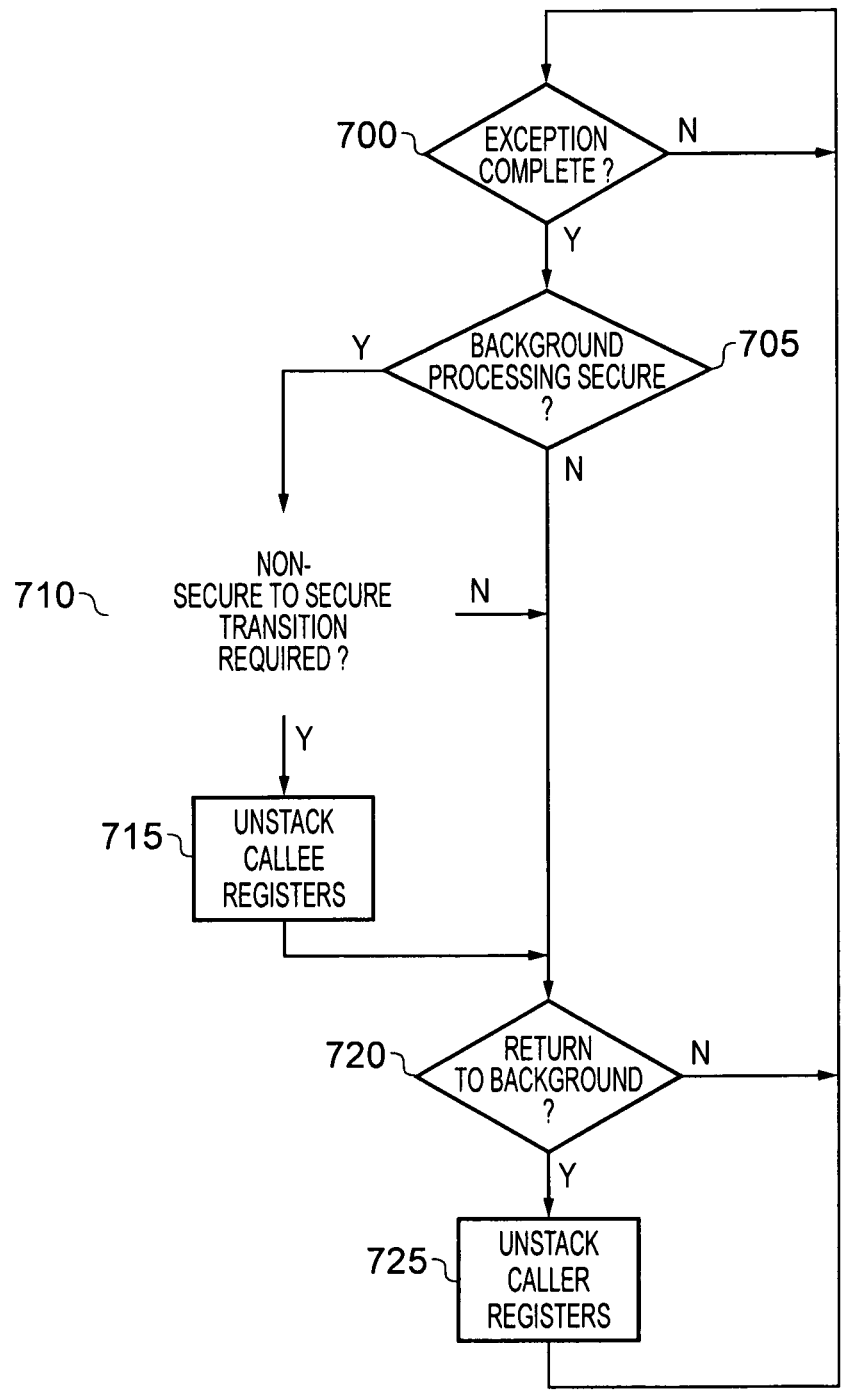
FIG. 13 is a flow diagram illustrating the unstacking operations performed on completion of an exception in accordance with one embodiment.

FIG. 13 is a flow diagram illustrating the unstacking operations performed on completion of an exception in accordance with one embodiment. At step 700, it is determined whether an exception has completed, and if so the process proceeds step 705, where it is determined whether the background processing was in the secure domain. As mentioned earlier, this can be determined with reference to the S bit 595 stored within the EXC_RETURN value. If the exception returned from is a pre-empting exception then, as discussed earlier, the background processing will be considered to be the exception handling routine interrupted by the pre-empting exception.

If the background processing was in the secure domain, then at step 710, it is determined whether a non-secure to secure transition is required as a result of completion of the current exception. If it is, then at step 715 the contents of the callee registers are unstacked, whereafter the process proceeds to step 720. If at step 710 it is determined that a non-secure to secure transition is not required, then the process proceeds directly to step 720.

At step 720, it is determined whether a return to background processing is required as a result of the exception completing, and if not the process returns to step 700 to await for the next exception to complete. However, if at step 720 it is determined that a return to background processing is required, then the process proceeds to step 725, where the contents of the caller registers are unstacked, prior to the process returning to step 700.

The above described techniques of embodiments enable an improved balance to be achieved between security and performance when performing state saving in response to exceptions, with the hardware mechanism of the exception control circuitry enabling effective handling of secure exceptions without requiring proxying through an exception handler.

The subject matter of the present application is related to subject matter discussed in commonly assigned co-pending U.S. application Ser. No. 13/368,419 and UK patent application number 1217531.1, and the entire contents of both of these documents are hereby incorporated by reference.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
processing circuitry configured to perform data processing operations in response to program code, the processing circuitry comprising exception control circuitry for controlling exception processing;
a data store configured to store data, the data store comprising a plurality of regions including a secure region and a less secure region, wherein the secure region is for storing data which is accessible by the processing circuitry when operating in a secure domain and not accessible by the processing circuitry when operating in a less secure domain; and
a plurality of registers configured to store data, the registers including a first subset of registers and a second subset of registers, the registers being accessible to said program code executing on the processing circuitry, wherein, in response to an exception, state saving of data from the registers to the data store is required in order to allow later restoring of that data to the registers when the exception has been handled;

wherein:
in response to an initial exception from background processing performed by the processing circuitry, the exception control circuitry is configured to perform state saving of data from the first subset of registers to the data store before triggering the processing circuitry to perform an exception handling routine corresponding to the exception, wherein the exception handling routine has responsibility for performing state saving of data from the second subset of registers to the data store; and
in response to a first exception causing a transition from the secure domain to the less secure domain, where the background processing was performed by the processing circuitry in the secure domain, the exception control circuitry is configured to perform additional state saving of the data from the second subset of registers to the data store before triggering the processing circuitry to perform the exception handling routine in the less secure domain.

2. The data processing apparatus according to claim 1, wherein in response to said first exception, the exception control circuitry is configured to clear the second subset of registers before triggering the processing circuitry to perform the exception handling routine.

3. The data processing apparatus according to claim 2, wherein in response to said first exception, the data processing apparatus is configured to ensure that the first subset of registers do not contain secure data, before the exception control circuitry triggers the processing circuitry to perform the exception handling routine.

4. The data processing apparatus according to claim 1, wherein if the exception control circuitry has performed the additional state saving before triggering the processing circuitry to perform the exception handling routine, then the exception handling routine does not perform the state saving of the second subset of registers.

5. The data processing apparatus according to claim 1, wherein if the exception control circuitry has performed the additional state saving before triggering the processing circuitry to perform the exception handling routine, then the exception handling routine also performs state saving of the second subset of registers.

6. The data processing apparatus according to claim 1, wherein said first exception comprises the initial exception occurring during the background processing.

7. The data processing apparatus according to claim 1, wherein said first exception comprises a tail-chained exception processed after the initial exception has been processed and before returning to the background processing being performed before the initial exception.

8. The data processing apparatus according claim 1, wherein in response to a further exception that is pending when said initial exception has been processed and before the processing circuitry has returned to said background processing being performed before the initial exception, the exception control circuitry is configured to control processing of the further exception as a tail-chained exception before causing the processing circuitry to return to the background processing.

9. A data processing apparatus according to claim 1, wherein:
said exception control circuitry is configured, in response to a new exception of lower priority than a current exception whose corresponding exception handling routine is still being performed, to control processing of the new exception as a tail-chained exception before causing the processing circuitry to return to the background processing;
the exception control circuitry being configured to perform no further state saving operations when controlling processing of the new exception except where said current exception is executed in said secure domain, said new exception indicates switching to said less secure domain, and said background processing was performed in said secure domain, whereupon said exception control circuitry is configured following completion of the exception handling routine for said current exception, to perform said additional state saving of the data from said second subset of registers and ensure said second subset of registers are cleared before triggering the processing circuitry to perform the exception handling routine corresponding to the new exception.

10. A data processing apparatus according to claim 1, wherein:
said exception control circuitry is configured, in response to a new exception of lower priority than a current exception whose corresponding exception handling routine is still being performed, to control processing of the new exception as a tail-chained exception before causing the processing circuitry to return to the background processing;
the exception control circuitry being configured to perform no state restoring operation when controlling processing of the new exception except where said current exception is executed in said less secure domain, said new exception indicates switching to said secure domain, and said background processing was performed in said secure domain, whereupon said exception control circuitry is configured following completion of the exception handling routine for said current exception, to perform a state restoring operation of the data into said second subset of registers before triggering the processing circuitry to perform the exception handling routine corresponding to the new exception.

11. The data processing apparatus according to claim 1, wherein if a pre-empting exception having a higher priority than said first exception occurs while performing the additional state saving of the second subset of registers, and the pre-empting exception does not require a transition from the secure domain to the less secure domain, the exception control circuitry is configured to reverse the additional state saving before triggering the processing circuitry to process the exception handling routine of the pre-empting exception.

12. The data processing apparatus according to claim 1, wherein if a current exception does not cause a transition from the secure domain to the less secure domain, and if a pre-empting exception having a higher priority than the current exception and requiring a transition from the secure domain to the less secure domain occurs before processing of the exception handling routine associated with the current exception begins, the exception control circuitry is configured to additionally perform the additional state saving of the data from the second subset of registers before triggering the processing circuitry to process the exception handling routine of the pre-empting exception.

13. The data processing apparatus according to claim 1, wherein if a pre-empting exception occurs after the exception control circuitry has triggered the processing circuitry to perform the exception handling routine corresponding to a current exception, but before that exception handling routine has completed, the exception control circuitry is configured to treat the current exception as said background processing when determining whether said state saving of said first subset of registers, or of said first and second subsets of registers is required before triggering the processing circuitry to perform the exception handling routine of the pre-empting exception.

14. The data processing apparatus according to claim 1, wherein the data store comprises a plurality of stacks including a secure stack in the secure region and a less secure stack in the less secure region.

15. The data processing apparatus according to claim 14, wherein in the state saving of data from the first subset of registers and the additional state saving of data from the second subset of registers, the exception control circuitry is configured to save the data to the one of the secure stack and the less secure stack corresponding to the security of the domain in which the processing circuitry was operating when performing said background processing.

16. A data processing apparatus according to claim 1, further comprising a secure configuration storage location for storing a secure configuration value indicating which of said plurality of registers are available for use by currently executing code for storing secure data, wherein in response to an exception causing the transition from the secure domain to the less secure domain, the exception control circuitry is configured to include within said second subset of registers one or more of the registers indicated by said secure configuration value.

17. A data processing apparatus according to claim 1, further comprising a storage location for storing an exception return value, said processing circuitry being configured to set a domain value within said exception return value to indicate the domain said data processing apparatus is operating in on taking an initial exception from said background processing, said exception control circuitry determining which of said registers should be subjected to state saving or state restoring operations in dependence upon said domain value.

18. A method of processing data on a data processing apparatus, said data processing apparatus comprising processing circuitry for performing data processing operations in response to program code, the processing circuitry comprising exception control circuitry for controlling exception processing, a data store for storing data, the data store comprising a plurality of regions including a secure region and a less secure region, wherein the secure region is for storing data which is accessible by the processing circuitry when operating in a secure domain and not accessible by the processing circuitry when operating in a less secure domain, and a plurality of registers configured to store data, the registers including a first subset of registers and a second subset of registers, the registers being accessible to said program code executing on the processing circuitry and wherein data is required to be state saved from the registers to the data store in response to an exception in order to allow later restoring of that data to the registers when the exception has been handled, said method comprising:

in response to an initial exception from background processing performed by the processing circuitry, employing the exception control circuitry to perform state saving of data from the first subset of registers to the data store before triggering the processing circuitry to perform an exception handling routine corresponding to the exception, wherein the exception handling routine has responsibility for performing state saving of data from the second subset of registers to the data store; and in response to a first exception causing a transition from the secure domain to the less secure domain, where the background processing was performed by the processing circuitry in the secure domain, employing the exception control circuitry to perform additional state saving of the data from the second subset of registers to the data store before triggering the processing circuitry to perform the exception handling routine in the less secure domain.

19. A data processing apparatus comprising:

processing means for performing data processing operations in response to program code, the processing means comprising exception control means for controlling exception processing;

data store means for storing data, the data store means comprising a plurality of regions including a secure region and a less secure region, wherein the secure region is for storing data which is accessible by the processing means when operating in a secure domain and not accessible by the processing means when operating in a less secure domain; and a plurality of register means configured to store data, the register means including a first subset of register means and a second subset of register means, the register means being accessible to said program code executing on the processing means, wherein, in response to an exception, state saving of data from the register means to the data store means is required in order to allow later restoring of that data to the register means when the exception has been handled;

wherein:

in response to an initial exception from background processing performed by the processing means, the exception control means performs state saving of data from the first subset of register means to the data store means before triggering the processing means to perform an exception handling routine corresponding to the exception, wherein the exception handling routine has responsibility for performing state saving of data from the second subset of register means to the data store means; and in response to a first exception causing a transition from the secure domain to the less secure domain, where the background processing was performed by the processing means in the secure domain, the exception control means performs additional state saving of the data from the second subset of register means to the data store means before triggering the processing means to perform the exception handling routine in the less secure domain.

* * * * *